(No Model.)

J. ANDERSON.
PIPE COUPLING.

No. 535,236.  Patented Mar. 5, 1895.

Witnesses,
J. H. Shumway
Lillian D. Kelsey

John Anderson
Inventor.
By Attys
Earle & Seymour

UNITED STATES PATENT OFFICE.

JOHN ANDERSON, OF PORTLAND, CONNECTICUT.

PIPE-COUPLING.

SPECIFICATION forming part of Letters Patent No. 535,236, dated March 5, 1895.

Application filed December 22, 1894. Serial No. 532,675. (No model.)

*To all whom it may concern:*

Be it known that I, JOHN ANDERSON, of Portland, in the county of Middlesex and State of Connecticut, have invented a new Improvement in Pipe-Couplings; and I do hereby declare the following, when taken in connection with the accompanying drawings and the letters of reference marked thereon, to be a full, clear, and exact description of the same, and which said drawings constitute part of this specification, and represent, in—

Figure 1:
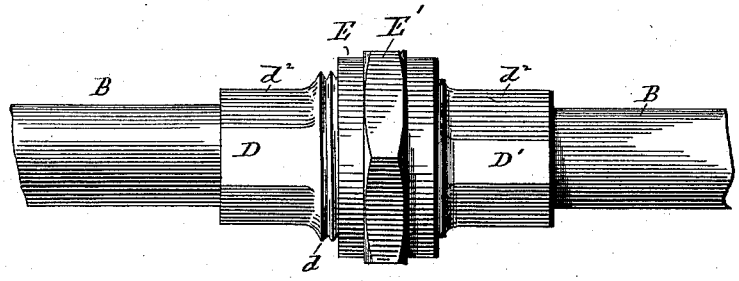
Figure 2:
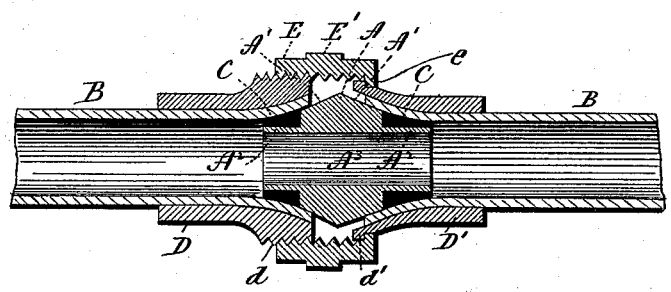
Figure 3:
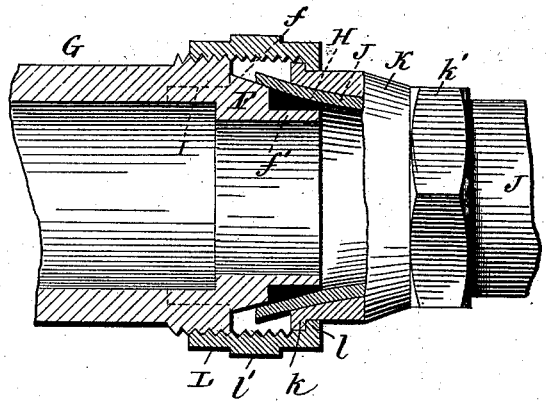

Figure 1, a view in side elevation of one form which a pipe-coupling constructed in accordance with my invention may assume; Fig. 2, a view thereof in central longitudinal section; Fig. 3, a view of one of the modified forms which the invention may take.

My invention relates to an improvement in pipe-couplings, the object being to produce a simple, compact, durable, effective and convenient device for coupling two lead pipes, or one lead pipe and one of iron or other expansible metal.

With these ends in view, my invention consists in a pipe-coupling comprising a joint-piece having an inclined annular bearing face and a hub projecting beyond the same and of smaller diameter, a packing ring applied to the said hub, and having its outer face inclined to agree with the inclination of the bearing face of the joint-piece, a coupling-member having the inner end of its longitudinal bore flared, and a collar engaging with the said member for drawing the pipe which it fits upon over the said ring and the inclined face of the joint-piece.

My invention further consists in a pipe-coupling having a joint-piece, the enlarged central portion of which has two oppositely inclined annular bearing faces, and which has two oppositely projecting hubs extending beyond those faces, and smaller in diameter than the same, two packing rings respectively applied to the said hubs, and having their outer faces inclined to agree with the inclination of the said bearing faces, two coupling-members the outer ends of the longitudinal bores whereof are flared, and one of which has exterior screw-threads and the other a coupling-shoulder, and an interiorly threaded collar taking into the said threads and having an inwardly projecting coupling-flange to coact with the said shoulder.

In carrying out my invention, as shown in Figs. 1 and 2 of the drawings, I construct a joint-piece having the periphery of its enlarged central or body-portion A, shaped to form two oppositely inclined annular bearing faces A' A'. The said joint-piece is also constructed with two corresponding, oppositely projecting hubs A² A², smaller in diameter than its central or body portion, and designed to respectively receive packing-rings C C, made of rubber or other equivalent material, adapted in internal diameter to fit snugly over the said hubs, and having their outer faces beveled with reference to the inclination of the bearing faces A' A' before mentioned, than which they are preferably slightly larger in diameter. The joint-piece also has a central longitudinal bore A³, which permits the free passage of water through it in one direction or the other. The flaring inner ends of the pipes B B are drawn over the inclined outer faces of the packing-rings, and also over the inclined bearing faces of the joint-piece, by means of coupling members D D', the inner ends of the longitudinal bores of which are flared. The coupling member D is constructed at its inner end with a wide, exteriorly threaded shoulder d, to receive the interiorly threaded coupler E, which is constructed with an inwardly extending coupling-flange e, which coacts with an outwardly projecting annular coupling shoulder d', formed at the inner end of the coupling-member D'. The said coupler E, is provided with a central band of gripping faces E', adapting it to be gripped by a wrench, but its adaptation to be so gripped may be varied as desired. It will be apparent that by rotating the coupler, the two coupling-members may be drawn together through the co-action of the said screw-threads and the flange e and shoulder d'.

For the purpose of preventing the coupling-members from rotating and twisting the ends of the lead pipe off while the coupler E is being rotated for the purpose of drawing them together, I preferably construct the exterior faces of the outer ends of the coupling-members with gripping faces d², adapting them to be gripped by wrenches. In coupling the two members together by means of this coupler, it is slipped over the coupling member D', from the outer end thereof, for the engagement of its inwardly projecting coupling flange e with the outwardly projecting annular coupling-shoulder d' of the said member. The internal screw-threads of the coupler are also engaged with the external screw-threads of the coupling member D, after which any turning of the coupler in the right direction will draw the two coupling-members together.

In using my improved pipe coupling when constructed as described, the respective coupling-members are slipped over the ends of the two lead pipes which it is desired to unite. The ends of the said pipes are then expanded, by means of a wooden plug, or any other approved instrument, until they fill the coupling members, as clearly seen in Fig. 2 of the drawings. The joint-piece with the packing-rings fitted to it is then introduced into the expanded ends of the lead pipes after which the coupling members are firmly coupled together by means of the coupler which thus draws the expanded ends of the lead pipes into such close contact with the packing-rings and bearing faces of the joint-piece that a very tight joint is secured. The joint-piece and the packing-rings form the real bond between the two pipes, and it is immaterial whether their ends abut or not. The joint is necessarily a very tight joint, on account of the extended area of contact between the joint-piece and the packing rings and the expanded ends of the pipes joined. If any leakage is observed in the joint, it is only necessary to manipulate the coupler to bring the coupling-members still closer together, or to renew the packing rings.

In Fig. 3 of the drawings, I have shown a view partly in side elevation and partly in vertical section of my improved pipe-coupling as modified for coupling one lead pipe, with a pipe of iron, or other non-expansible metal. In this modified construction, as shown, the joint-piece F is formed integral with an iron or other non-expansible pipe G, and constructed with a single inclined bearing-face f, and with a hub f' of smaller diameter than the said bearing face beyond which it projects. A packing-ring H formed of rubber or equivalent material, is fitted over the said hub, to the exterior diameter of which its interior diameter corresponds, while its outer face is inclined to agree with the inclined bearing face, than which it is slightly larger. If desired, the joint-piece F might be formed independently of and set into the iron pipe G, as indicated by the broken line I. The expanded end of the lead pipe J, is drawn over the packing-ring, and the inclined face of the joint-piece, by means of a coupling-member K, the bore of which flares at its inner end, at which the said piece is constructed with an outwardly projecting annular coupling-shoulder k, which is engaged by an inwardly projecting coupling flange l, formed at the corresponding end of the coupler L, the inner face of which is threaded to take into the exterior threads formed upon the adjacent end of the pipe G, which in this instance, takes the place of an independent coupling member to coact with the coupling-member K. To adapt the coupler L to be turned for the purpose of drawing the pipes together, it is constructed with a band of gripping faces L' for the application of a wrench, while for the purpose of holding the coupling-member K against rotation while the coupler L is being turned, it is constructed at its outer end with a band of gripping-faces k' for the application of a wrench or equivalent tool. In using this form of my device the coupling-member K is applied to the lead pipe J, the end of which is then expanded by means of a plug, or other instrument, to fill the flaring inner end of the longitudinal bore of the same member. The coupler L is then slipped over the coupling member K, from the outer end thereof, until its coupling flange l engages with the coupling shoulder k, after which further rotation of the coupler will draw the coupling member K toward the pipe G, and hence draw the expanded end of the lead pipe J upon and over the packing-ring H, and the inclined face f of the joint-piece F. In this case the joint is formed between the expanded end of the lead pipe and the inclined outer face of the packing-ring and the inclined face of the joint-piece.

It is apparent that in carrying out my invention I may make some changes from the construction herein shown and described, and I would therefore have it understood that I do not limit myself thereto. I am aware, however, that it is old to employ a joint-piece having faces inclined in opposite directions for the purpose of forming a joint between two lead pipes, and combined with two coupling members, and a collar for drawing them together, and I do not, therefore, claim such construction broadly.

Having fully described my invention, what I claim as new, and desire to secure by Letters Patent, is—

1. A pipe-coupling comprising a joint-piece having an inclined annular bearing face and a hub projecting beyond the same and of smaller diameter, a packing ring applied to the said hub, and having its outer face inclined to agree with the inclination of the bearing face of the joint-piece, a coupling-member having the inner end of its longitudinal bore flared, and a collar engaging with the said member for drawing the pipe which it fits, upon and over the ring and inclined face of the joint-piece, substantially as described.

2. A pipe-coupling having a joint-piece, the enlarged central portion of which has two oppositely inclined annular bearing faces, and which has two oppositely projecting hubs extending beyond those faces and smaller in diameter than the same, two packing rings respectively applied to the said hubs, and having their outer faces inclined to agree with the inclination of the said bearing-faces, two coupling members, the inner ends of the longitudinal bores whereof are flared, and one of which has exterior screw-threads, and the other a coupling-shoulder, and an interiorly threaded collar taking into the said threads and having an inwardly projecting coupling-flange to coact with the said shoulder, substantially as set forth.

In testimony whereof I have signed this specification in the presence of two subscribing witnesses.

JOHN ANDERSON.

Witnesses:
JAS. G. STRONG,
C. H. BELL.